(12) United States Patent
Fiore (10) Patent No.: US 6,179,061 B1
(45) Date of Patent: Jan. 30, 2001

(54) SEAT OPERABLE LAWN TREATMENT DEVICE

(76) Inventor: Michael John Fiore, 719 Burchell Ave., Highland Park, IL (US) 60035

(*) Notice: Under 35 U.S.C. 154(b), the term of this patent shall be extended for 0 days.

(21) Appl. No.: 09/524,667

(22) Filed: Mar. 13, 2000

(51) Int. Cl.$^7$ .................................................. A01B 45/02
(52) U.S. Cl. ............................................ 172/21; 172/540
(58) Field of Search .................. 172/21, 22, 540, 172/556, 574

(56) References Cited

U.S. PATENT DOCUMENTS

| | | | |
|---|---|---|---|
| 4,084,642 | 4/1978 | Killion | 172/21 |
| 4,158,391 | 6/1979 | Clements | 172/22 |
| 4,776,404 | 10/1988 | Rogers et al. | 172/21 |
| 4,867,244 | 9/1989 | Cozine et al. | 172/22 |
| 5,579,847 | 12/1996 | Postema | 172/21 X |
| 5,823,269 | 10/1998 | Leclerc | 172/21 |

*Primary Examiner*—Christopher J. Novosad
(74) *Attorney, Agent, or Firm*—James P. Hanrath (57) ABSTRACT

A seat operated lawn treatment device adapted for connection to a powered vehicle. such as a mower or tractor has a ground mobile wheeled base frame. A first subsidiary frame having a seat thereon is pivotally secured to the wheeled base frame. A second subsidiary frame is also pivotally secured to the wheeled base frame so that at least a portion of the second subsidiary frame is disposed under and moveable directly or indirectly by at least a portion of the first subsidiary frame. The second subsidiary frame includes a pair of axially aligned spaced bearings supporting an axle borne turf treatment unit and is spring biased to a raised and inoperative transport position of the axle borne turf treating unit when no weight is placed upon the seat of the first subsidiary frame. However, when weight is placed on the seat of the first subsidiary frame the second subsidiary frame is moved to a lowered operative ground-engaging position of its interconnected the axle borne turf treating unit. The axle borne turf treatment unit is preferably one of an aerator, a roller, or a slicer.

14 Claims, 10 Drawing Sheets

SEAT OPERABLE LAWN TREATMENT DEVICE

BACKGROUND OF THE INVENTION

1. Field of the Invention

The present invention relates generally to lawn maintenance equipment, particularly to turf treatment devices of the type adapted to be connected to a powered vehicle, such as a tractor, truck, utility vehicle, lawn mower, and the like for towing over the ground or turf to be treated, for aerating, rolling, slicing, and seeding the soil of a lawn to cultivate thick and healthy grass.

2. Description of the Related Art

Modern lawns and grass fields require a great deal of care and attention in order to nurture a thick green carpet of grass. Such care includes consistent mowing, watering, and thatching as well as periodic overseeding and fertilization. In addition, it is imperative that a healthy lawn be aerated at least twice a year and, preferably, even more often. The importance of aerating lawns to permit water, oxygen, and nutrients to reach the grass root region has been recognized for sometime by experts in lawn care, particularly those involved in maintaining functional lawn areas such as golf courses, athletic fields, parks, and other suitable grassy areas. Aeration usually entails creating a multitude of closely spaced small holes in the surface of the ground to permit air and oxygen to be absorbed into the soil. The holes also tend to increase moisture penetration into the soil and serve as receptacles for grass seed to prevent the seed from being washed away and to promote germination and growth. Thus, aeration of turf in particular is essential to allow ventilation to accelerate decomposition of thatch and humus and to provide solid access for nutrient supply and for reseeding.

Numerous turf treating devices have been previously proposed. For example, drums have been used to roll or compact the ground. Further, devices having a large cylindrical drum studded about its periphery with a plurality of short radially extending spike-cores have been used to be rolled or pulled over the ground such that when it rolls, the spike-cores are driven into the soil to remove plugs or cores of soil and/or grass thereby creating shallow holes. Similar devices involve a roller or rotatably mounted element equipped with soil penetrating elements, which usually comprise disc-like knives, spoon tines or hollow coring tines.

For example, in U.S. Pat. No. 5,823,269 there is disclosed a turf aerator attachment for a tractor comprising a frame and a plurality of aerator disc assemblies. Each aerator disc assembly comprises a plurality of aerator disc mounting arms extending between the frame and the aerator disc axle. The mounting arms are rotatably journalled on the frame to thereby permit pivotable movement of each of the aerator disc assemblies. Interconnecting means are utilized to interconnect aerator disc assemblies. The arrangement allows for the turning of the aerator apparatus without damage to the equipment and turf.

In U.S. Pat. No. 5,579,847 there is disclosed a compact lawn aerator comprising a rigid frame having a hitch for releasibly fastening the frame to the back of a self-propelled mower. An elongated axle is secured to the under side of the frame and a set of aerator wheels are rotatably mounted at spaced intervals along the axle. Each of the aerator wheels has a generally disc-shaped hub from the periphery of which four spikes radiate. Each spike initially projects from the hub along a radius but curves along its length in the direction of rotation of the wheel. The spikes are tapered to a sharpened point and their curve is determined so that, as the wheel rotates, the ends of the spikes pierce the soil at substantially right angles and the shank of the spikes slip into the ground progressively through the pierce point. This greatly reduces the force needed to drive the spikes into the ground, thus reducing the weight and size of the device.

In U.S. Pat. No. 4,776,404 there is disclosed an implement for aerating and dethatching turf having multiple aerator units each including a plurality of earth piercing aerator elements mounted on a shaft. Arms of each aerator unit supporting the shafts are independently swingable to move the shafts between horizontal positions and positions inclined from horizontal in accordance with the contour of the ground or encountered soil conditions as the aerator is advanced across the earth. A spring assembly urging each aerator unit toward the ground has structure for causing any upward swinging movement of the arms of each unit to be resisted by the weight of the frame whenever such arms are pivoted upwardly passed a predetermined elevation, in order to provide additional force where highly compacted soil conditions are found. Springs common to adjacent aerator units engage a bracket that is shiftably connected to adjacent arms of the unit to enable the common spring to direct its extension force on the arm which is in the higher position.

However, the foregoing turf perforating or treating machines do not provide for a retraction structure or the like which is selectively and momentarily operable to move the perforating, rolling, or turf treating device to a non-performing position, thus enabling the machine to be moved across areas which would be damaged by the turf treatment tools or where turf treatment operations are not desired. For example, golf courses typically have cart paths, stone or plate yardage markers, underground watering systems which provide for periodic key-hole access structure, water head piping, or automated spray disc discharge of water, and other special lawn areas or structure wherein it is desirable to selectively and momentarily disengage turf treatment operations before resuming the same. Other lawns may have exposed root structure, stones or other impenetrable hard objects, field boundary markers or other conditions where is also desirable to selectively and momentarily disengage turf treatment operations before resuming the same.

Several attempt have been made to address this problem. For example in U.S. Pat. No. 4,867,244 there is disclosed a walk-behind turf aerating apparatus which includes two pairs of tine arm assemblies, each assembly having a pair of vertically reciprocating tine arms for driving coring tines into the turf. A tine arm return mechanism includes a gear box for each pair of tine arms, the lower ends of the tine arms being connected to cranks extending from the gear box to reposition the tine arms prior to ground engagement. Stops are provided to limit the tine arm travel. A spring-loaded lifting mechanism permits manual shifting of the tine arm mechanism form a lowered ground-engaging position to a raised transport position. A belt drive with clutch and reduction drive for the wheels also drives the tine arm mechanism with automatic disengagement when the wheels are in the transport position. A handle assembly is connected to the apparatus frame through a pivotal connection including vibration damping elements for minimizing transmittal of vibrations, particularly in the vertical plane, to the handle.

In U.S. Pat. No. 4,158,391 there is disclosed a soil aerating device which is adapted for connection to a powered vehicle which includes a first frame rotatably supporting a drum carrying a plurality of core-forming tines adapted to penetrate the ground or turf to be aerated and remove a plug of soil and/or grass as the drum is rolled over the surface of the ground or turf, and which further includes a second frame having a forward and rear portions. The first frame is pivotally connected to the rear portion of the second frame for limited relative pivotal movement between the two frames and the forward portion of the second frame is pivotally connected to the vehicle for pivotal movement of the two frames relative to the vehicle between a raised position wherein the drum and tines are disengage from the ground or turf and a lowered position wherein the drum is in engagement with the ground or turf. An actuator, such as a double-acting, hydraulically-actuated ram, connected between the vehicle and a second frame moves the two frames between the raised and lowered positions and applies a downward force on the second frame, when the two frames are in the lowered position, to thereby transfer a portion of the weight of the vehicle to the drum through the second frame, the pivotal connection between the first and second frames, and the first frame. The pivotal connection between the two frames permits the first frame and the drum to pivot relative to the second frame, thereby assuring full penetration of the tines as the drum rolls over hills and down into valleys in the ground or turf with a minimal effect on the ground-engaging traction of the vehicle wheels.

In U.S. Pat. No. 4,084,642 there is disclosed a turf perforating machine for aerating lawns by removing plugs therefrom comprising a wheeled frame having a plurality of reciprocating tools, each connected by a linkage to an eccentric mounted on a journal and each linkage slidably mounted in a pivotal guide secured to the journal which prevents binding of the linkage as a frame is moved across the lawn and the tool is disposed in the ground, and further including a retractor unit for pivoting the guide, linkage and tools to a nonperforming position.

SUMMARY OF THE INVENTION

In accordance with the present invention there is provided a lawn treatment device adapted for connection to a powered vehicle comprising a ground mobile wheeled base frame, a first subsidiary frame having a seat thereon, the first subsidiary frame being pivotally secured to the wheeled base frame, a second subsidiary frame pivotally secured to the wheeled base frame at least a portion of which is disposed under and moveable directly or indirectly by at least a portion of the first subsidiary frame, the second subsidiary frame further having a pair of axially aligned spaced bearings, an axle borne turf treatment unit supported by the pair of axially aligned spaced bearings of the second subsidiary frame, the second subsidiary frame being spring biased to a raised and inoperative transport position of the axle borne turf treatment unit when no weight is placed upon the seat of the first subsidiary frame and being movable to a lowered operative ground-engaging position of the axle borne turf treatment unit when weight is placed upon the seat of the first subsidiary frame. The axle borne turf treatment unit is preferably one of an aerator, a roller, or a slicer.

The lawn treatment device of the present invention may include means for fastening of the wheeled base frame to a mower, tractor, or other self-propelled vehicle. Further, the first subsidiary frame may include a downwardly extending contact bolt located at the portion of said first subsidiary frame which moves at least a portion of the second subsidiary frame when weight is placed upon the seat of the first subsidiary frame. Preferably, such a contact bolt is selectively and adjustably threadedly engaged in a threaded bore of the first subsidiary frame so that the degree of its threaded engagement is related to the degree of ground operative engagement of the axle born turf treatment unit.

The wheeled base frame of the lawn treatment device of the present invention preferably includes a platform section forward of said seat so that a user thereof may temporarily stand on the same to remove his or her weight from the seat of the first subsidiary frame to thereby cause the second subsidiary frame to be spring biased to a raised and inoperative transport position of the axle borne turf treatment unit. The wheeled base frame of the lawn treatment device of the present invention also preferably includes a cut-out area section defined by an open area inside interior facing borders of the so that at least a portion of said second subsidiary frame and the axle borne turf treatment unit secured by the spaced axially aligned bearings of the second subsidiary frame is disposed within the cut-out area section. A housing element of the first subsidiary frame or the second subsidiary may be employed to segregate the seat of the first subsidiary frame from the cut-out area section thereby safeguard the user of the device from the mechanical structures of the desired axle borne turf treatment unit.

The present invention advantageously provides for a seat operated lawn treatment device having a retractable mechanical structure for an axle borne perforating, rolling, or slicing turf treatment unit which is selectively and momentarily operable to temporarily move the turf treatment unit to a non-performing position before an easy resumption of turf treatment operation is desired, thus enabling the machine to be moved across areas which would be damaged by the turf treatment tools or where turf treatment operations are not desired.

Additional features and advantages of the present invention will become apparent to those skilled in the art from the following description and the accompanying figures illustrating preferred embodiments of the invention, the same being the present best mode for carrying out the invention.

DESCRIPTION OF THE PREFERRED EMBODIMENTS

Referring now to the drawings, there is shown in FIGS. 1 through 3, and FIGS. 5 and 6, a seat operable lawn treatment device 10 constructed in accordance with the teachings of the present invention. In the front perspective view of FIG. 1, the lawn treatment device 10 is comprised of a ground mobile wheeled base frame 12 having a front arm hitch extension 14 having a hitch post 16 at its proximal end 18. Hitch post 14 is capable of securing the lawn treatment device 10 to a self-propelled vehicle, such as a self propelled mower, by nut and bolt, chain wire, ball and hitch or other known mounting means. The front arm hitch extension 14 is integral with the generally rectangularly shaped wheeled base frame 12 at its distal end 20. The wheeled base frame 12 is ground mobile by aligned spaced wheels 22 and 24 attached on the base frame side periphery by eye bolt and gear collar 13. The wheeled base frame 12 has a front foot floor platform section 26 and a rear cut-out area section 28 which is defined by the open area inside the interior facing borders of a rear edge 30 of the foot floor section 26, a pair of rearward base frame branch extensions 32 and 34, and base distal end frame 36. The wheeled base frame 12 also has a pair of spaced axially aligned of upright post arms 38 and 40 at a rearward portion thereof which serve as post for a spring biasing function hereinafter described.

The wheeled base frame 12 is interconnected with both a first subsidiary frame 42 pivotally attached thereto at a front portion 44 of the foot floor section 26 and a second subsidiary frame 46 pivotally secured within the rear cut-out area section 28.

The first subsidiary frame 42 includes a pair of pivot extension arms 48 and 50 each having an outer end flange 52 and 54 respectively which are pivotally secured by bolts 56 and 58 respectively to the front portion 44 of foot floor section 26. Pivot extension arms 48 and 50 extend rearward of end flanges 52 and 54 respectively at a slightly inward angle toward each other before their distal ends terminate into and are integral with a pair of upward extensions 60 and 62 that likewise are integral with and terminate into seat brace frame 64. Seat brace frame 64 supports seat neck 66 and seat 68 at an upper central portion 70 thereof. A front housing panel 72 and a rear housing panel 74 are each attached to the seat brace frame by bolt, rivet, screw, or other known attachment means. The front housing panel 72 extends in fold sections forward and downward of the seat brace frame 64 and at the outer end thereof is attached to an upper surface of pivot extension arms 48 and 50. The rear housing panel 74 extends in fold sections rearward and downward of seat brace frame 64. Both housing panels serve as housing elements to segregate the seat 68 of the first subsidiary frame 42 from the rear cut-out area section 28 of the wheeled base frame 12 to thereby shield an operator of the lawn treatment device from a turf treating unit located thereunder within the rear cut-out area section of the wheeled base frame. Alternatively, the housing elements could take the form of a housing dome attached to an upper facing surface of the second subsidiary frame 46 to so segregate and shield.

Figure 2:
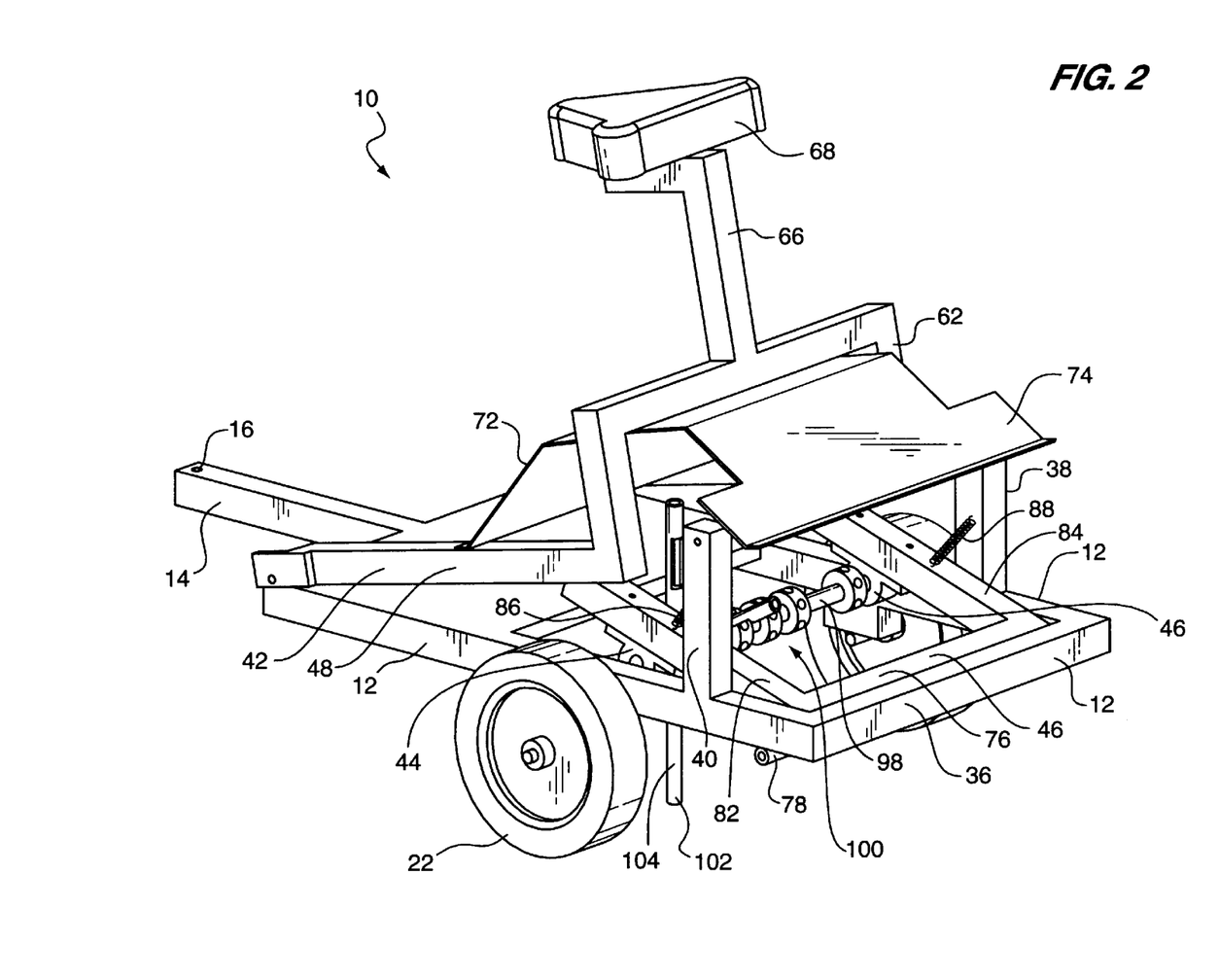
FIG. 2 is a rear perspective view of the lawn treatment device of FIG. 1 and shows the axle borne turf treating unit being comprised of an aerator assembly with only a single set of aeration knives thereof being shown for ease of illustration of the axle borne treating unit.

As best observed in the rear perspective view of FIG. 2, the second subsidiary frame 46 is generally U-shaped and includes an intermediate section 76 pivotally secured adjacent to base distal end frame 36 of wheeled base frame 12 upon seat members 78 and 80 (see also the bottom view of FIG. 3) so as to dispose the second subsidiary frame within the wheeled base frame at the outer periphery of the rear cut-out area section 28 under a portion of the pivot extension arms 48 and 50 of the first subsidiary frame 42. Intermediate section 76 at each lateral end thereof terminates into and is integral with branch arms 82 and 84 which, as discussed in more detail hereinafter, are spring biased into a raised position by bias springs 86 and 88 attached between an upper surface of the branch arms and upright post arms 38 and 40 of the wheeled base frame 12.

Figure 3:
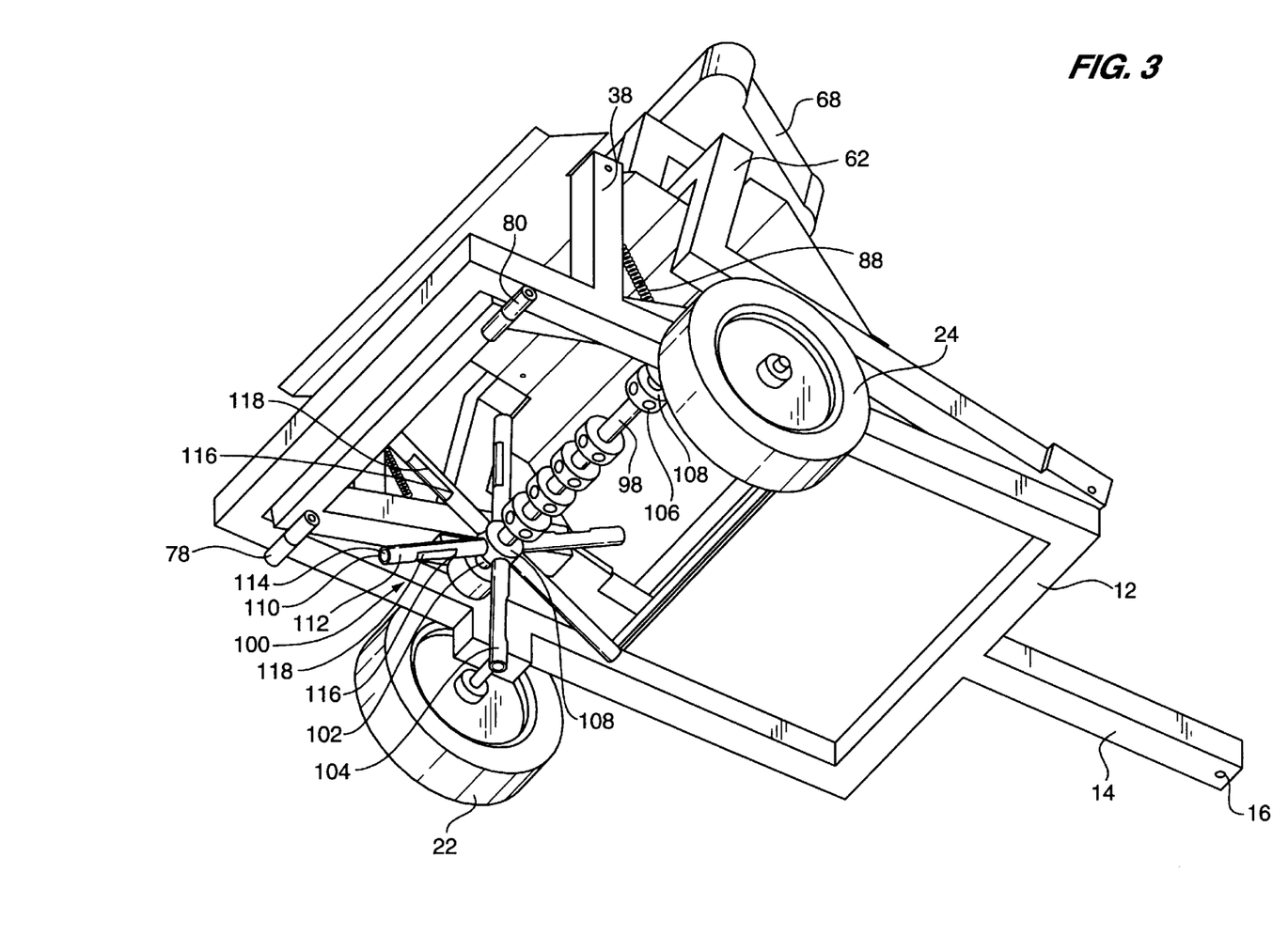
FIG. 3 is a bottom perspective view of the lawn treatment device of FIG. 1 and 2.
Figure 4:
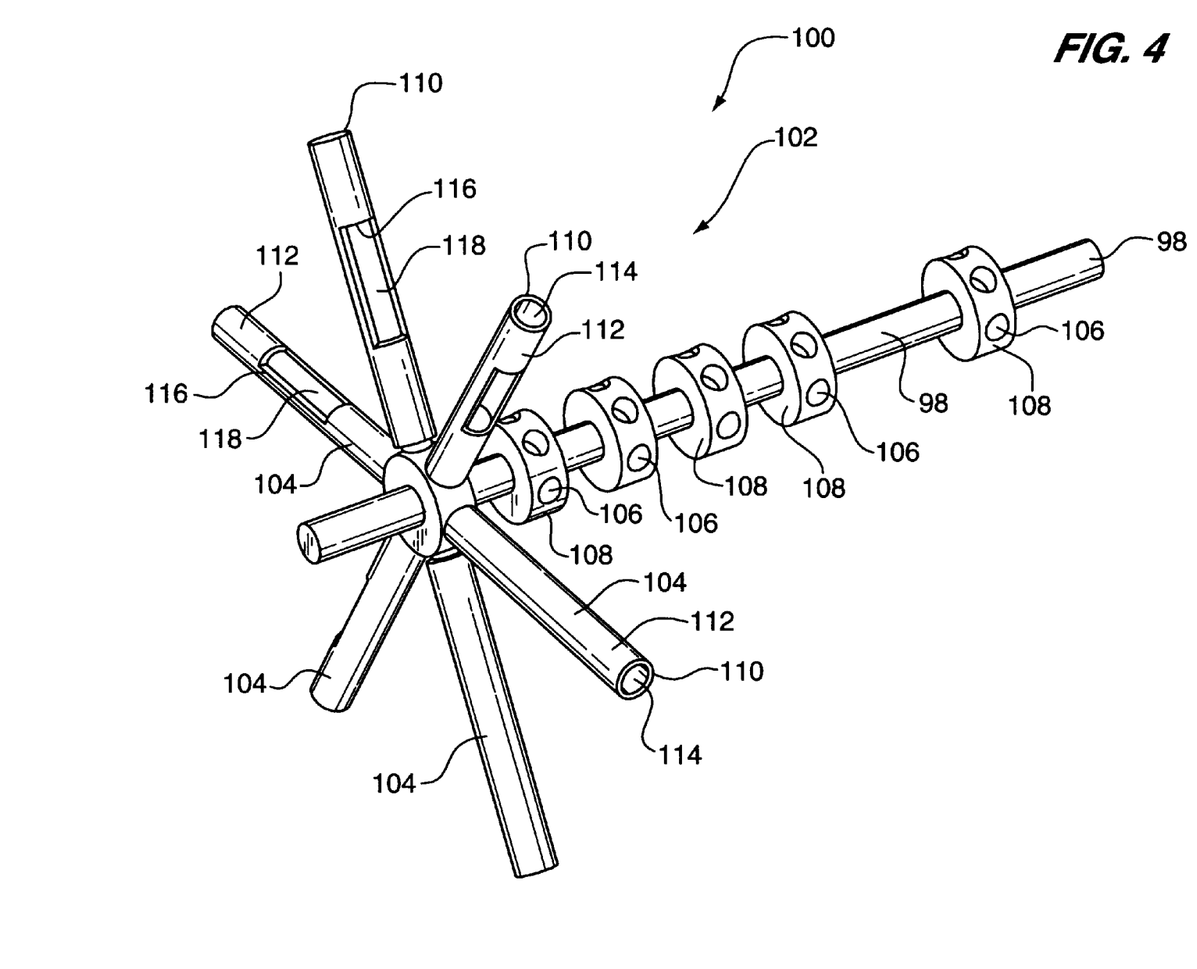
FIG. 4 is a rear perspective view of the aerator assembly of FIG. 2.

In FIGS. 2 and 3, bearings 94 and 96 are bolt attached to the underside surface of each of the branch arms 82 and 84 of the second subsidiary frame 46 in spaced axially aligned relationship to each other. Bearings 94 and 96 are designed to releasably receive and secure an axle 98 of an axle borne turf treatment unit 100 therebetween.

The axle borne turf treatment unit 100 may be of various designs depending upon the function and purpose of such unit. For example, in FIGS. 1 through 3 the axle borne turf treatment unit 100 is an aerator assembly 102 wherein a plurality of aerator knives 104 are threadedly secured at a proximal end thereof into thread holes 106 of axle ring 108. For clarity and ease of illustration, FIGS. 1 through 4 show one set of six aerator knives 104 nested in its axle ring 108, while the remaining five axle rings are vacant, it being understood that the remaining five axle rings would likewise host corresponding sets of aerator knives nested therein. Each aerator knife 104 has a cut-edge 110 at a distal end thereof such that an engagement mode rotation of axle 98 drives distal end portion 112 of each aerator knife 104 into the lawn or ground turf to cut and capture a first aerated turf "plug" within cylindrical core 114 of the aerator knife 104. A second revolution and engagement of the cut-edge into the lawn or ground turf cuts and captures a second aerated turf "plug" which force drives the first aerated turf "plug" against discharge core-wall 116 for discharge through "plug" discharge slot 118 at the cylindrical periphery of each aerator knife.

Figure 7:
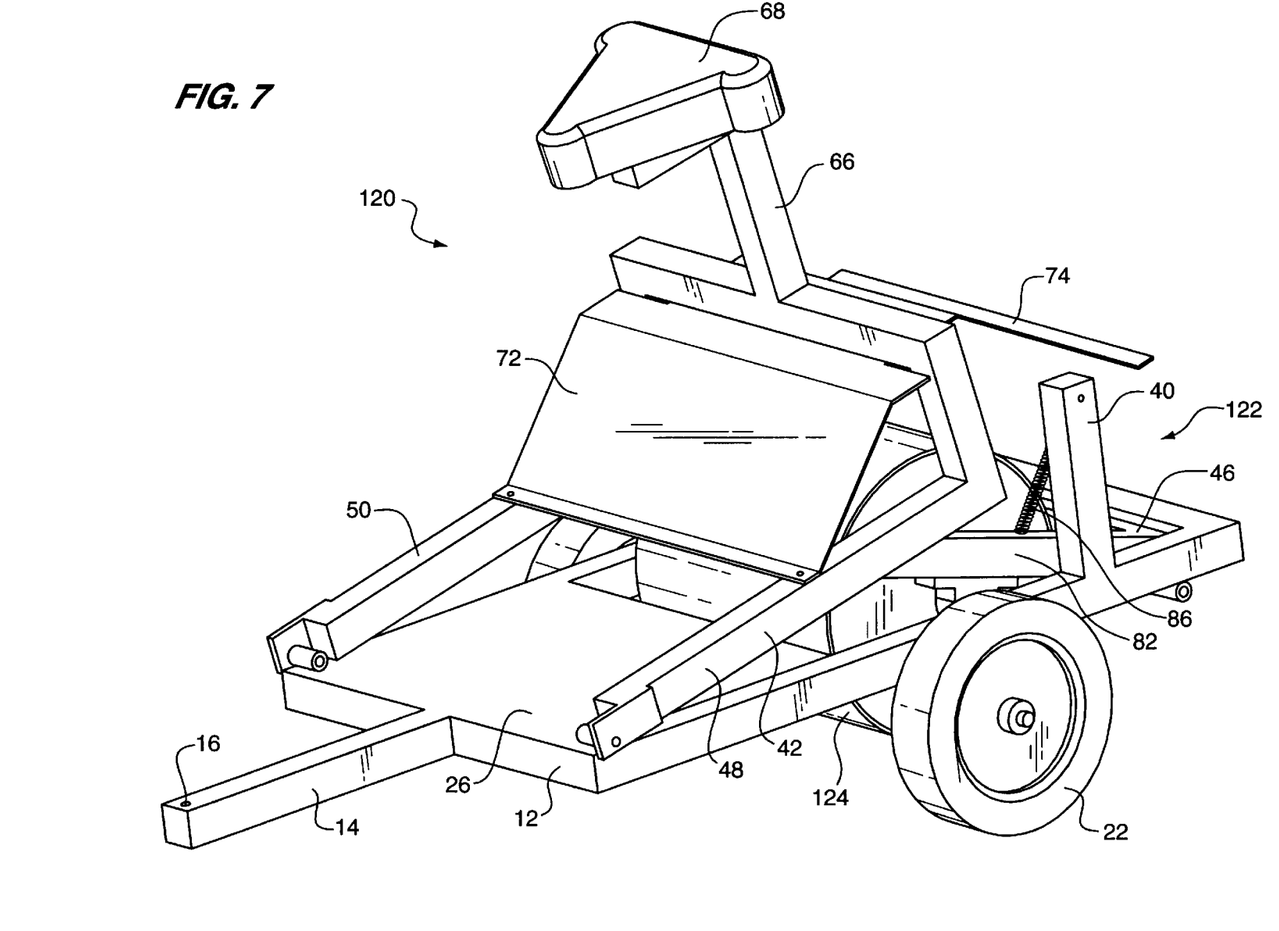
FIG. 7 a front perspective view of another lawn treatment device constructed in accordance with the teachings of the present invention and shows the axle borne turf treating unit being comprised of a roller.
Figure 8:
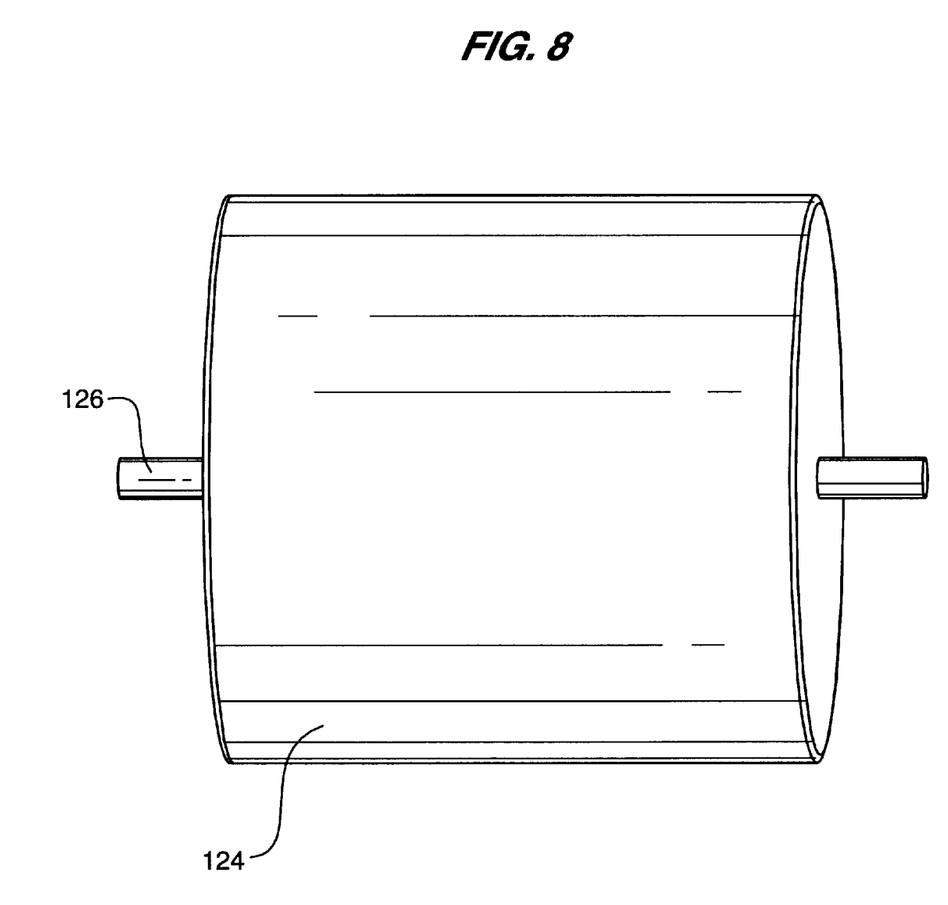
FIG. 8 is a rear perspective view of an exemplary roller.
Figure 9:
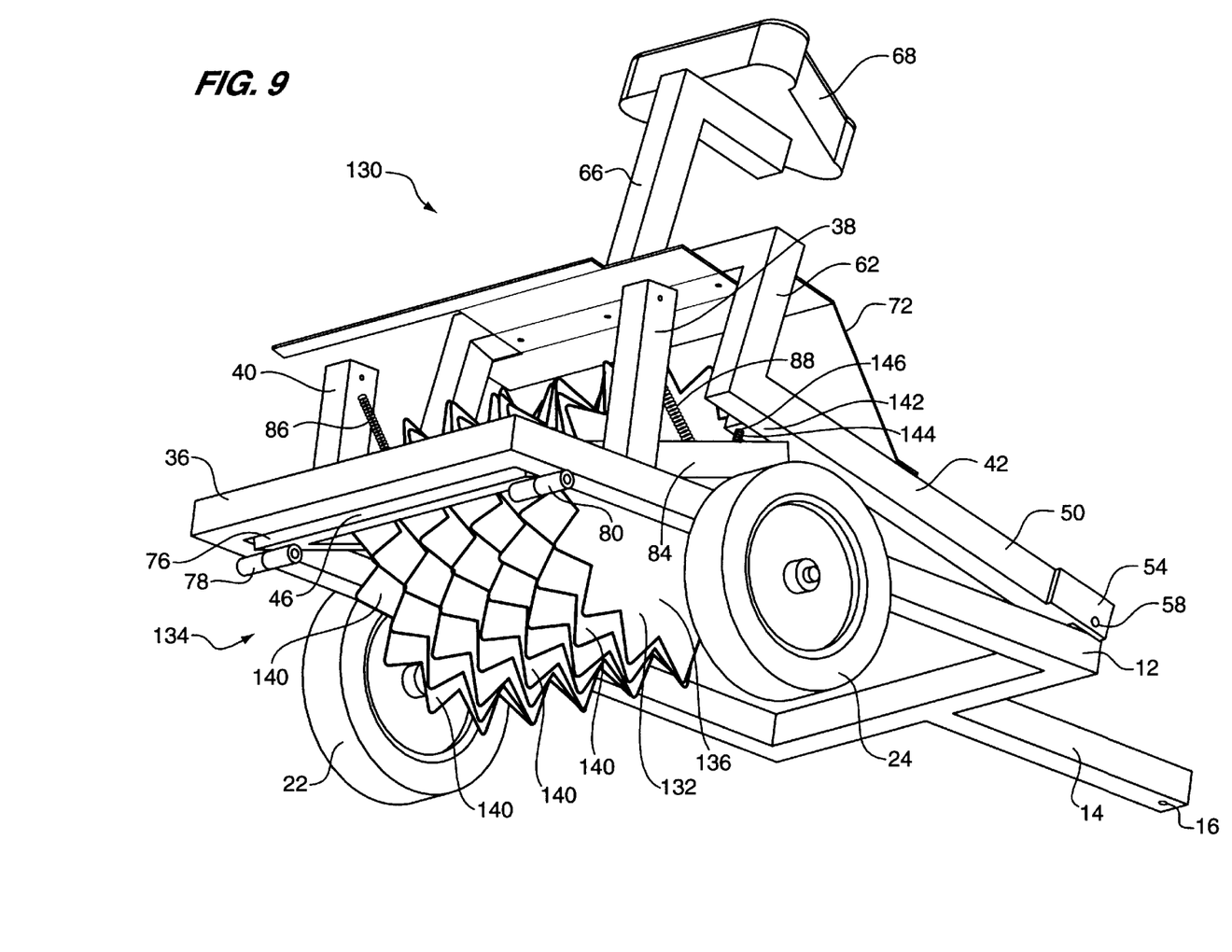
FIG. 9 a bottom rear perspective view of another lawn treatment device constructed in accordance with the teachings of the present invention and shows the axle borne turf treating unit being comprised of a slicer.

FIGS. 7 and 9 illustrate embodiments of the seat operable lawn treatment device of the present invention having alternative axle borne turf treatment units. In both FIG. 7 and FIG. 9, previously described structural features of the lawn treatment devices bear their previously described corresponding reference numerals. FIG. 7 is a front perspective view of a lawn treatment device 120 wherein the axle borne turf treatment unit 122 is a roller comprised of cylindrical roll drum 124 borne on axle 126. Rotation of the drum upon a lawn or ground turf is useful in compacting or leveling operations. FIG. 9 is a bottom rear perspective view of a lawn treatment device 130 having a slicer 132 as its axle borne turf treatment unit 134. For clarity and ease of illustration, the housing element of the rear housing panel 74 has been removed from FIG. 9. The slicer 132 has a plurality of cut wheels 136 borne on axle 138 wherein the annular periphery of each cut-wheel has a plurality of cut teeth 140 so that upon rotation of the cut-wheel 136, the cut-teeth 140 slice cuts corresponding borrows into a lawn or ground turf to be treated for either aeration or seeding operations.

The axle borne turf treatment units of the present invention achieve their ground engagement turf treatment rotation by virtue of the ground mobility of the seat operable lawn treatment device while the rotatable axle borne treatment units held in bearings 94 and 96 contact the lawn or turf to be treated.

In FIGS. 1 through 3 and 7 and 9, the lawn treatment devices 10, 120, and 130 are illustrated in a raised and inoperative transport position of the axle borne turf treatment unit due to no weight being placed on seat 68 thereof. In this regard, bias springs 86 and 88 respectively extend downwardly from an inward face of the spaced axially aligned upright post arms 38 and 40 respectively of the wheeled base frame 12 and are connected with an upper surface of the branch arms 82 and 84 respectively of the second subsidiary frame to spring bias both the lower disposed second subsidiary frame 46 and the upper disposed first subsidiary frame 42 in a raised inoperative, non-engagement transport position of the axle borne turf treatment unit. Since the axle borne turf treatment unit is held by bearings 94 and 96 at the underside of the second subsidiary frame 46, the spring bias raising of the second subsidiary frame 46 likewise raises the axle born turf treatment unit to avoid contact thereof with a lawn or ground turf to be treated. Bias springs 86 and 88 must necessarily be of sufficient tensil strength to spring bias support in a raised position the load of the second subsidiary frame, the bearings, and the axle borne turf treatment unit together with the first subsidiary frame, or alternatively a further plurality of bias springs may be employed to accomplish the same.

Figure 1:
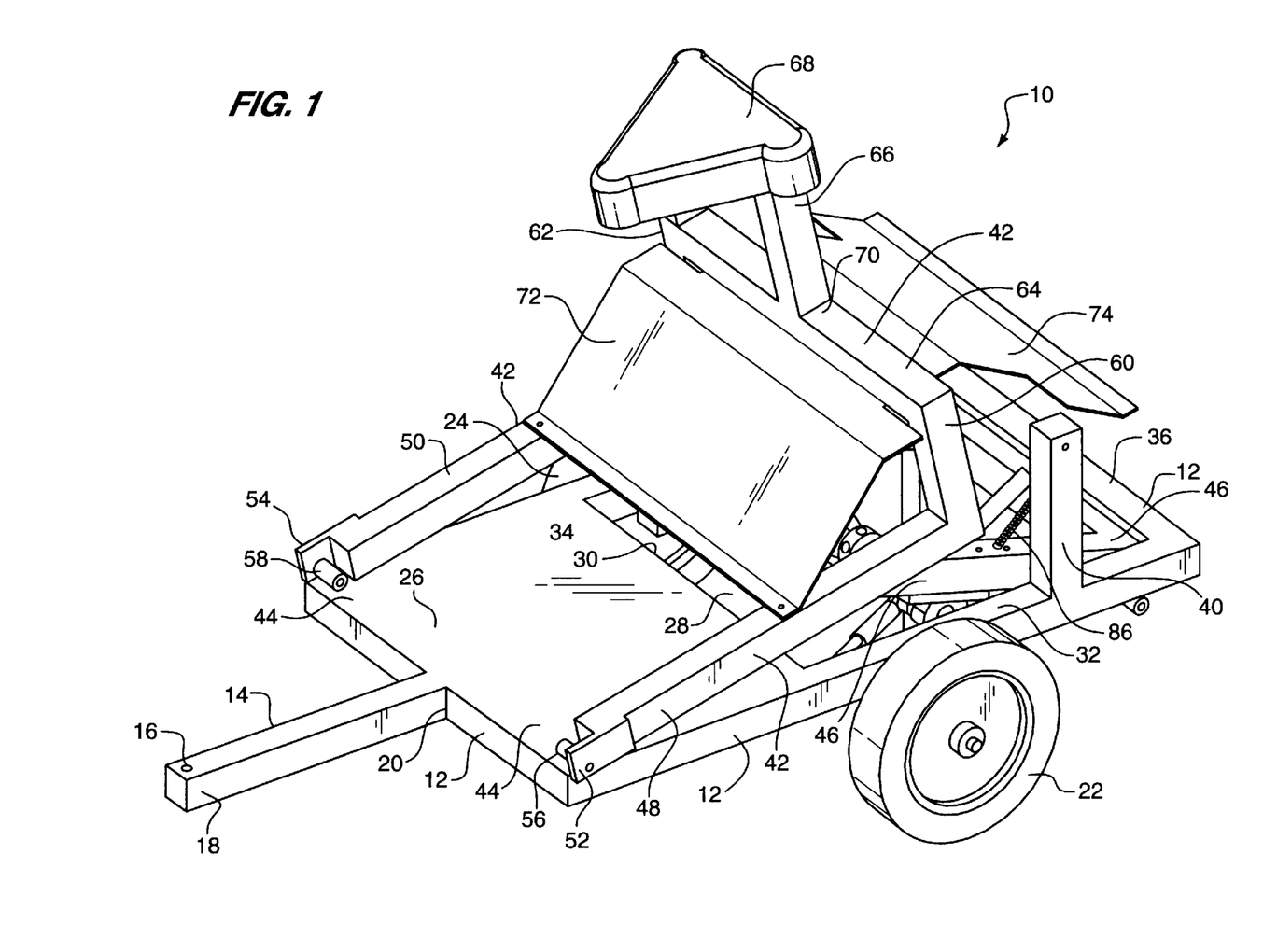
FIG. 1 is a front perspective view of a lawn treatment device constructed in accordance with the teachings of the present invention and shows a first subsidiary frame having a seat thereon pivotably supported in an upright non-engagement position upon a wheeled base frame, the first subsidiary being capable, when weight is placed upon the seat, of contacting a spring biased second subsidiary frame to engage an axle borne turf treating unit.
Figure 5:
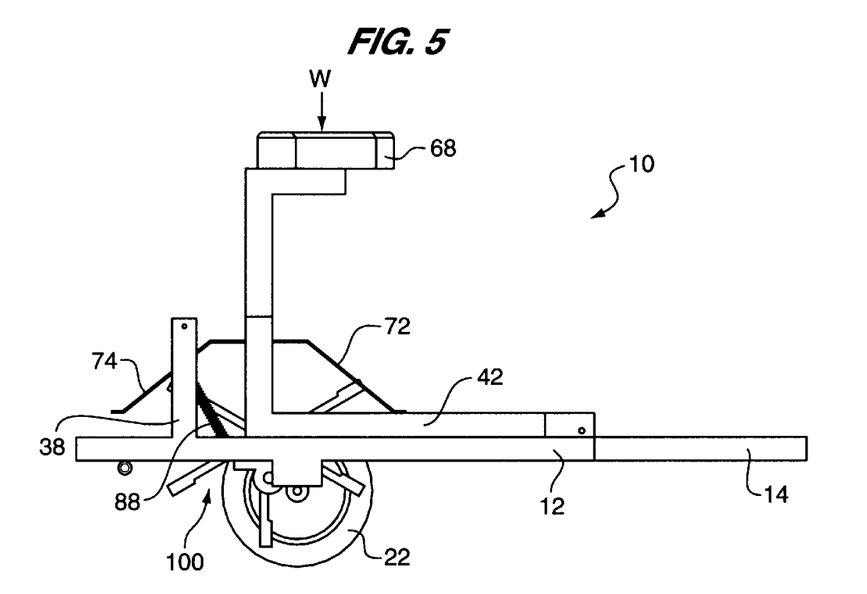
FIG. 5 is a side view of the lawn treatment device of FIG. 2 with a proximal wheel of the wheeled base frame removed for clarity of illustration and shows the first subsidiary frame having a seat in a lowered engagement position upon the second subsidiary frame to engage an axle borne turf treating unit.
Figure 6:
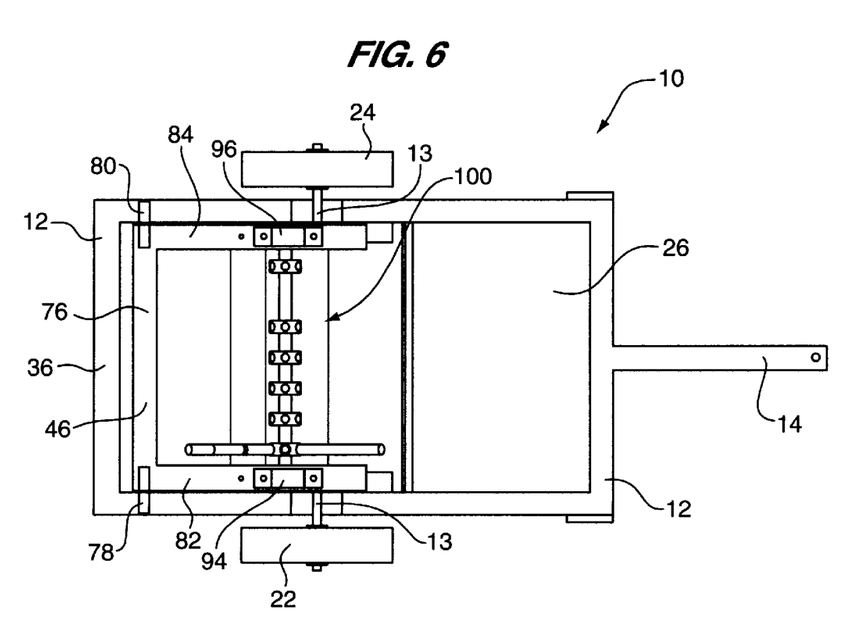
FIG. 6 is a bottom view of the lawn treatment device of FIG. 5 with the proximal wheel now being illustrated.

FIGS. 5 and 6 illustrate the seat operable lawn treatment device 10 of FIGS. 1 through 3 with the seat bearing first subsidiary frame 42 being disposed in a lowered engagement position upon the second subsidiary frame 46 to engage the axle borne turf treating unit 100. In this regard, when weight W is placed upon seat 68 of the first subsidiary frame 42 (namely, when an operator of the turf treatment unit sits thereon), the first subsidiary frame is moved downwardly such that at least a portion of an underside surface 142 of the first subsidiary frame contacts and forces downward the second subsidiary frame 46 to thereby achieve a lowered operative, ground-engagement position of the axle borne turf treatment unit 100 secured by bearings 94 and 96 at the underside of the second subsidiary frame. Release of the weight upon the seat 68 of the first subsidiary frame 42 (when the operator raises his or her weight from the seat by standing on foot floor section 26) allows the second subsidiary frame 46 to return to its spring biased raised position wherein at least a portion of the upper surface of the second subsidiary frame contacts and forces upward at least a portion of the lower surface of the first subsidiary frame to thereby raise both frames and achieve the raised inoperative, non-engagement transport position of the axle borne turf treatment unit held by bearings 94 and 96 at the underside of the second subsidiary frame 46.

As best observed at FIG. 9 wherein the axle borne turf treatment unit is a slicer 132 for slit seeding or fertilizing operations, the portion of the underside surface 142 of the first subsidiary frame 42 which contacts and forces downward the second subsidiary frame 46 may optionally but preferably have a thread contact bolt 144 threadedly secured into a threaded bore 146 thereof. The selected and adjustable degree to which the thread contact bolt 144 is threadedly secured within threaded bore 146 will accomplish a selected and adjustable corresponding degree of engagement of the cut-teeth 140 of cut wheels 136 of the slicer 132 into a lawn or ground turf engaged by the axle borne turf treatment unit.

Figure 10:
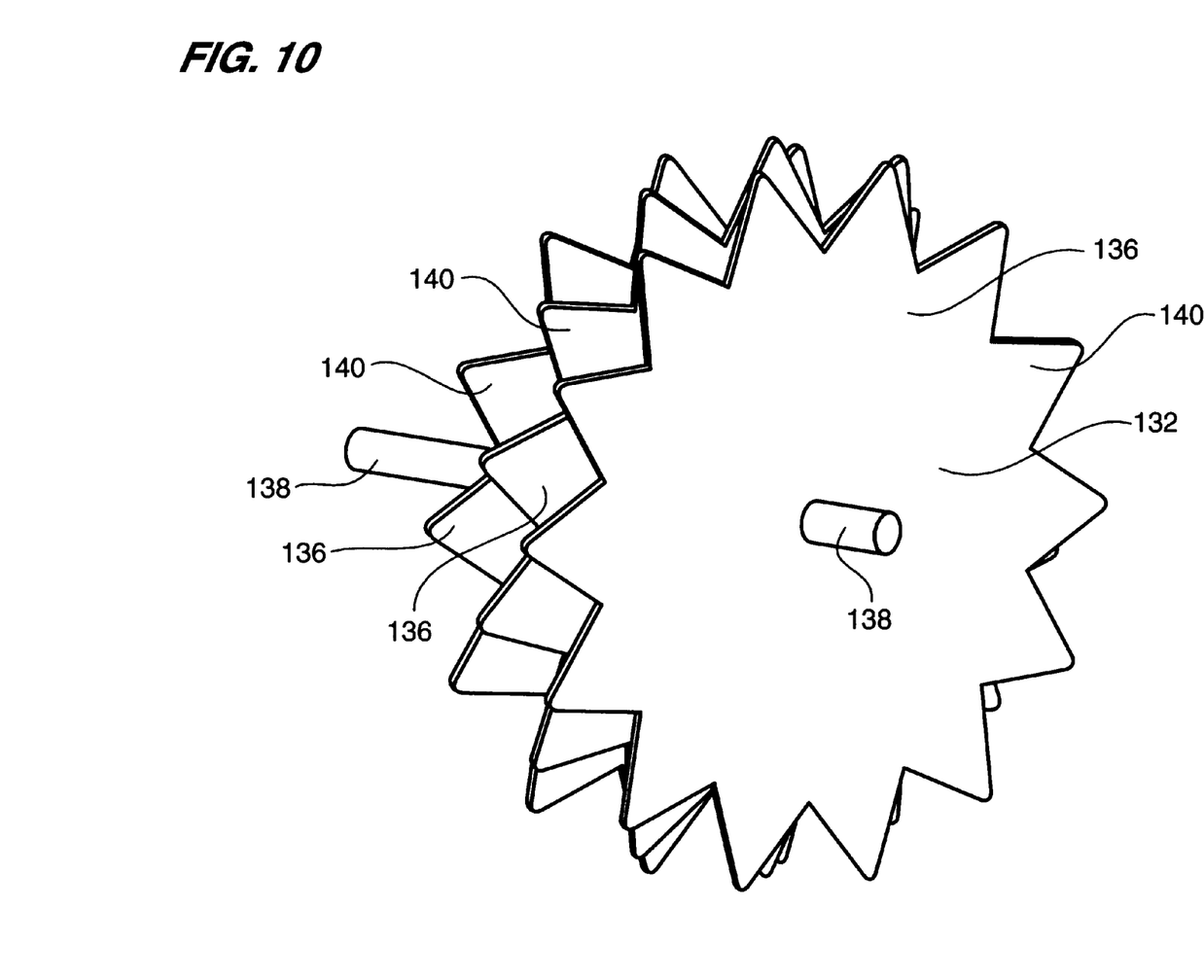
FIG. 10 is a rear perspective view of an exemplary slicer.
Figure 11:
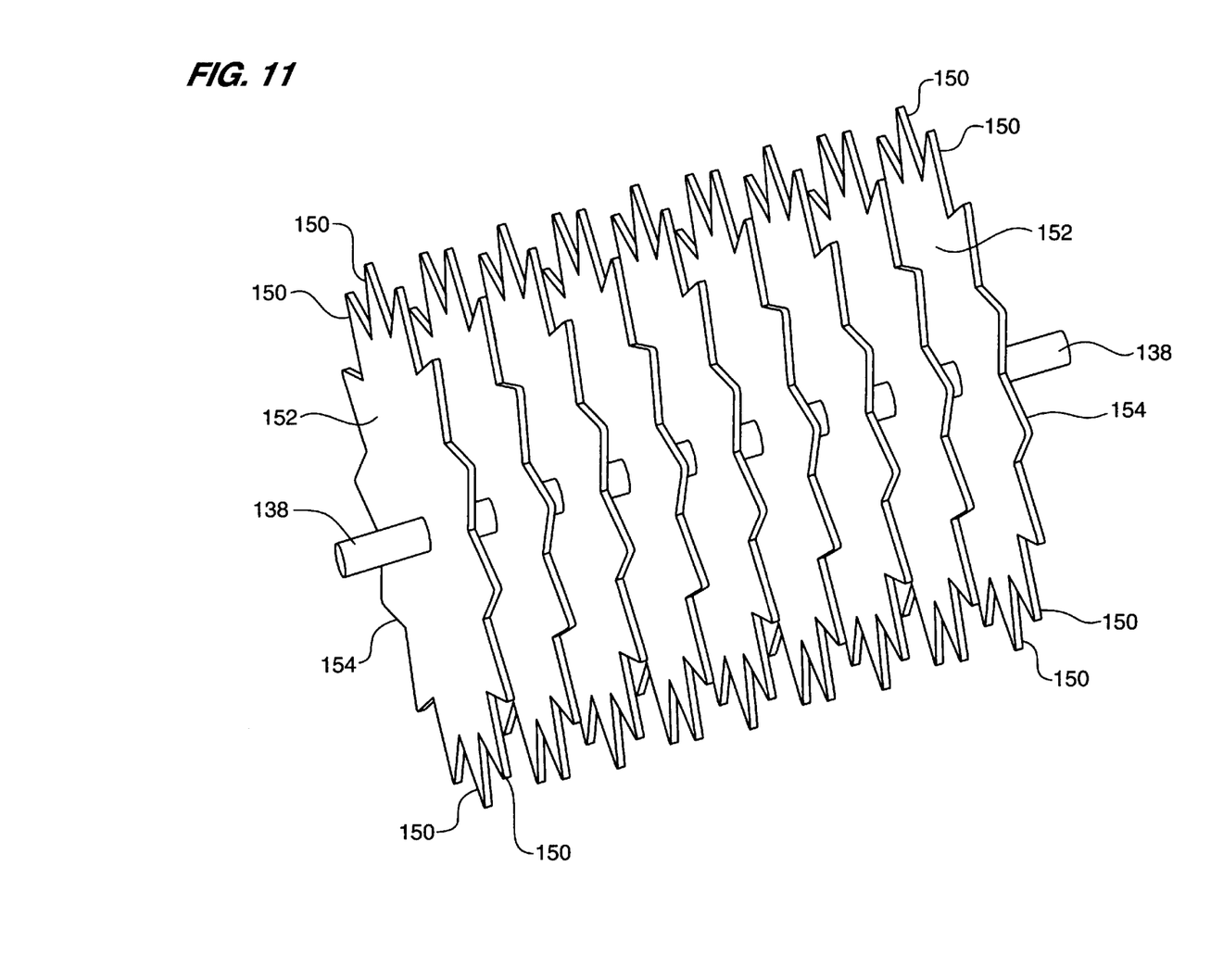
FIG. 11 is a rear perspective view of yet another exemplary slicer.

FIGS. 4, 8, 10, and 11 illustrate exemplary embodiments of the axle borne turf treatment units of the present invention. In addition to the FIG. 4 aerator assembly, and the FIG. 8 roller previously discussed, FIGS. 10 and 11 illustrate that the slicer for slit seeding or fertilizing operations may be of various designs. In FIG. 10, the entire outer annular periphery of each of the plurality of cut-wheels 136 is comprised of a continuous plurality of uniform cut-teeth 140. In FIG. 11, a plurality of non-uniform cut-teeth 150 are arranged at opposing ends of a plurality of non-circular cut-wheels 152 of slicer 154.

From the foregoing description, it will be apparent that the SEAT OPERATED LAWN TREATMENT DEVICE of the present invention has a number of advantages, some of which have been described above and others of which are inherent in the invention. Also, it will be understood that modifications can be made to the SEAT OPERABLE LAWN TREATMENT DEVICE or its environment of use described above without departing from the teachings of the present invention. Accordingly, the scope of the invention is only to be limited as necessitated by the accompanying claims.

I claim:

1. A lawn treatment device adapted for connection to a powered vehicle comprising
   a ground mobile wheeled base frame,
   a first subsidiary frame having a seat thereon, said first subsidiary frame being pivotally secured to said wheeled base frame,
   a second subsidiary frame pivotally secured to said wheeled base frame, at least a portion of said second subsidiary frame being disposed under and moveable directly or indirectly by at least a portion of said first subsidiary frame, said second subsidiary frame further having a pair of axially aligned spaced bearings,
   an axle borne turf treatment unit supported by said pair of axially aligned spaced bearings of said second subsidiary frame,
   said second subsidiary frame being spring biased to a raised and inoperative transport position of said axle borne turf treatment unit when no weight is placed upon said seat of said first subsidiary frame and being movable to a lowered operative ground-engaging position of said axle borne turf treatment unit when weight is placed upon said seat of said first subsidiary frame.

2. A lawn treatment device according to claim 1 wherein said axle borne turf treatment unit is selectively and releaseably supported by said pair of axially aligned spaced bearings of said second subsidiary frame.

3. A lawn treatment device according to claim 1 wherein said axle borne turf treatment unit is one of an aerator, a roller, or a slicer.

4. A lawn treatment device according to claim 1 wherein said wheeled base frame includes means for fastening of the frame to a self-propelled vehicle.

5. A lawn treatment device according to claim 4 wherein said means for fastening of said wheeled base frame to a self-propelled vehicle comprises a front arm extension of said wheeled base frame being releaseably secured to said self-propelled vehicle.

6. A lawn treatment device according to claim 4 wherein said self-propelled vehicle is a mower.

7. A lawn treatment device according to claim 1 wherein said first subsidiary frame includes a downwardly extending contact bolt of said portion of said first subsidiary frame which moves at least a portion of said second subsidiary frame when weight is placed upon said seat of said first subsidiary frame.

8. A lawn treatment device according to claim 7 wherein a said downwardly extending contact bolt is selectively and adjustably threadedly engaged in a threaded bore of said portion of said first subsidiary frame which moves at least a portion of said second subsidiary frame when weight is placed upon said seat of said first subsidiary frame.

9. A lawn treatment device according to claim 8 wherein the degree of selective and adjustable threaded engagement of said downwardly extending contact bolt in said threaded bore of said portion of said first subsidiary frame is related to the degree of ground operative engagement of said axle born turf treatment unit.

10. A lawn treatment device according to claim 1 wherein said wheeled base frame includes a platform section forward of said seat.

11. A lawn treatment device according to claim 1 wherein said wheeled base frame includes a cut-out area section defined by an open area inside interior facing borders of said frame and at least a portion of said second subsidiary frame is disposed within said cut-out area section.

12. A lawn treatment device according to claim 11 wherein said first subsidiary frame or said second subsidiary includes one or more housing elements to segregate said seat from said a cut-out area section.

13. A lawn treatment device according to claim 1 wherein said wheeled base frame includes a pair of spaced axially aligned upright post arms, each upright post arm bearing at least one spring connected to said second subsidiary frame.

14. A lawn treatment device according to claim 1 wherein said pair of axially aligned spaced bearings of said second subsidiary frame are disposed under said second subsidiary frame.

* * * * *